United States Patent
Tejero Salinero

(10) Patent No.: US 9,267,529 B2
(45) Date of Patent: Feb. 23, 2016

(54) REMOVABLE LONG-LIVED AND REUSABLE U-SHAPED HYBRID NUT

(75) Inventor: Isaac Tejero Salinero, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 321 days.

(21) Appl. No.: 13/201,026

(22) PCT Filed: Feb. 4, 2010

(86) PCT No.: PCT/US2010/023162
§ 371 (c)(1),
(2), (4) Date: Aug. 11, 2011

(87) PCT Pub. No.: WO2010/093550
PCT Pub. Date: Aug. 19, 2010

(65) Prior Publication Data
US 2011/0311331 A1   Dec. 22, 2011

(30) Foreign Application Priority Data
Feb. 12, 2009   (ES) .................................. 200900474

(51) Int. Cl.
*F16B 37/02* (2006.01)
*F16B 37/04* (2006.01)

(52) U.S. Cl.
CPC ................ *F16B 37/02* (2013.01); *F16B 37/041* (2013.01)

(58) Field of Classification Search
CPC ........ F16B 37/02; F16B 37/041; F16B 37/04; F16B 37/044; F16B 39/14; F16B 41/002

USPC ......... 411/175, 174, 111, 112, 516, 520, 522, 411/523, 525

See application file for complete search history.

(56) References Cited

U.S. PATENT DOCUMENTS

| | | | | |
|---|---|---|---|---|
| 2,771,113 | A * | 11/1956 | Flora ............................. | 411/167 |
| 3,118,480 | A * | 1/1964 | Kreider ........................ | 411/173 |
| 3,123,880 | A * | 3/1964 | Barry et al. .................. | 411/352 |
| 3,145,753 | A * | 8/1964 | Kreider ........................ | 411/112 |
| 3,229,743 | A * | 1/1966 | Derby .......................... | 411/175 |
| 3,414,035 | A * | 12/1968 | Munse ......................... | 411/175 |
| 3,426,818 | A * | 2/1969 | Derby .......................... | 411/175 |
| 3,669,170 | A * | 6/1972 | Schuster ...................... | 411/175 |
| 4,243,086 | A * | 1/1981 | Kuttler et al. ................ | 411/174 |
| 4,684,305 | A * | 8/1987 | Dubost ........................ | 411/174 |
| 4,729,706 | A | 3/1988 | Peterson et al. | |

(Continued)

FOREIGN PATENT DOCUMENTS

DE   29807055 U1   6/1998

OTHER PUBLICATIONS

ISR for PCT/US2010/023162 dated May 28, 2010.

*Primary Examiner* — Gary Estremsky
(74) *Attorney, Agent, or Firm* — Hauptman Ham, LLP

(57) ABSTRACT

A NUT WITH A C-SHAPED PROFILE, of the type formed by a punched metal sheet folded onto itself for fixing onto a panel, wherein one of the arms has a hole for the arrangement of a screwed device with at least one thread and wherein the other arm, which is aligned with the axis of the preceding hole, has another hole for receiving the nut tightening screw, the upper base being provided with incisions which define horizontal connecting portions separated from the body of the upper base and longitudinal connecting portions which form an extension of the former and which join together the upper base and lower base.

38 Claims, 3 Drawing Sheets

(56) References Cited

U.S. PATENT DOCUMENTS

| | | | |
|---|---|---|---|
| 4,755,090 A * | 7/1988 | Macfee et al. | 411/82 |
| 4,826,374 A * | 5/1989 | Baglin | 411/103 |
| 4,883,397 A * | 11/1989 | Dubost | 411/174 |
| 4,897,005 A * | 1/1990 | Peterson et al. | 411/175 |
| 5,039,264 A * | 8/1991 | Benn | 411/175 |
| 5,423,646 A * | 6/1995 | Gagnon | 411/184 |
| 5,890,858 A * | 4/1999 | Leroux | 411/175 |
| 6,450,747 B1 * | 9/2002 | Fischer | 411/174 |
| 6,758,645 B2 * | 7/2004 | Curley et al. | 411/111 |
| 7,243,400 B2 * | 7/2007 | Boville | 24/290 |
| 7,878,745 B2 * | 2/2011 | Allen et al. | 411/175 |
| 7,896,596 B2 * | 3/2011 | Rausch et al. | 411/174 |
| 2003/0007844 A1 * | 1/2003 | Terry | 411/186 |
| 2003/0147715 A1 | 8/2003 | Curley, Jr. et al. | |
| 2005/0036851 A1 * | 2/2005 | Dang et al. | 411/175 |
| 2009/0003961 A1 * | 1/2009 | Benkel et al. | 411/190 |

* cited by examiner

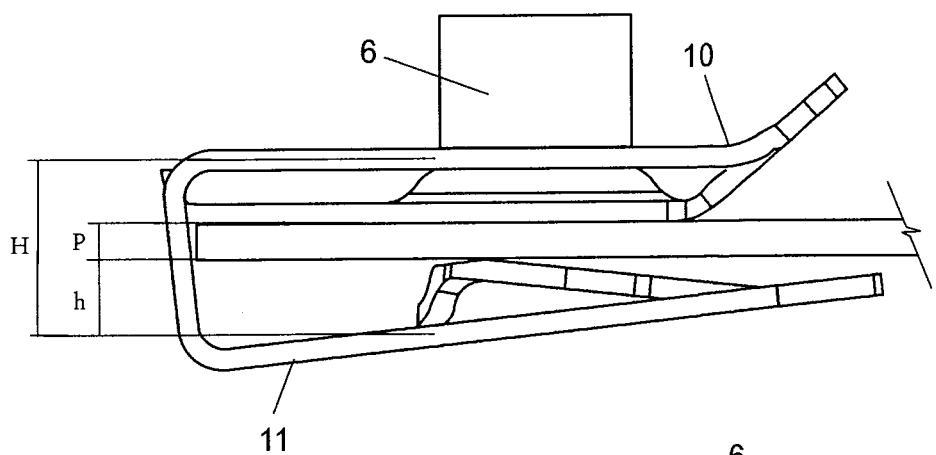
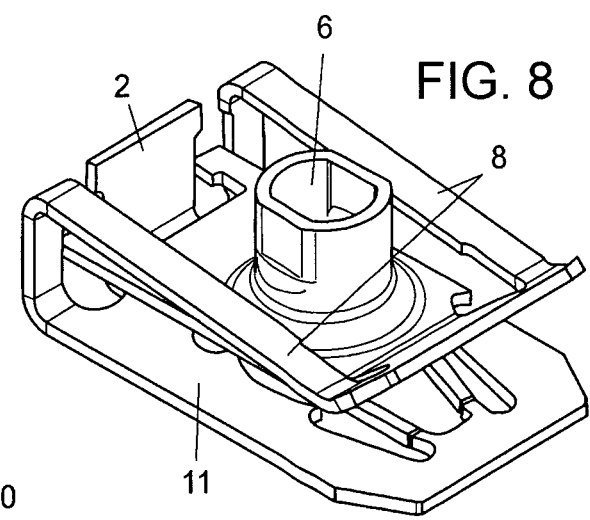
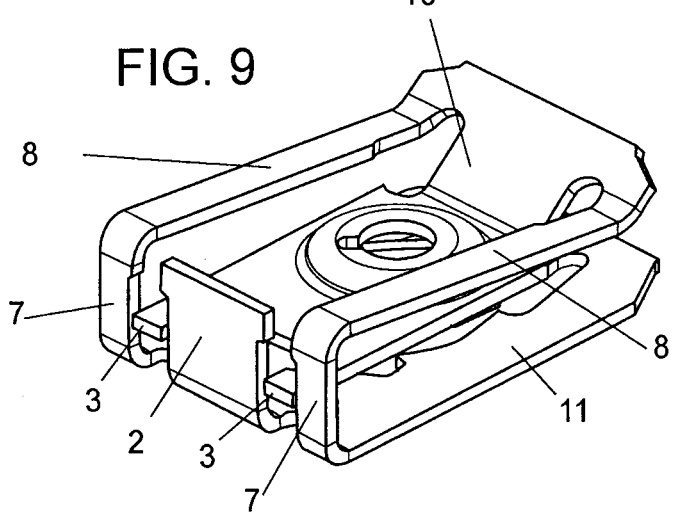

REMOVABLE LONG-LIVED AND REUSABLE U-SHAPED HYBRID NUT

RELATED APPLICATIONS

The present application is national phase of PCT/US2010/023162 filed Feb. 4, 2010, and claims priority from Spanish Application Number 200900474 filed Feb. 12, 2009.

FIELD OF THE INVENTION

The present invention relates to a nut with a C-shaped profile, of the type formed by means of punching of a flat strip which, folded in the manner of a clip, is mounted on a panel and which has a passage for a screw and at least a single thread for the screwed member, wherein a device for extracting the nut as well as other improvements to the clip nut are provided.

PRIOR ART

Clip nuts, various categories of which exist, are widely known in the art, the common feature of all of them being that they are formed by a metal sheet which is folded onto itself, said fold and the rigidity or elasticity thereof acting as a tensioning spring during fixing to the panel onto which it is mounted.

For example, the known document ES1020704 describes a clip of this type where the nut is tightened by means of a screw which is mounted on a single thread formed by a helical profile in the upper strip of the clip. Said clip is provided with shaped incisions for facilitating the movement and elasticity of said upper strip with respect to the lower part of the clip nut and adapting advantageously to different panel thicknesses.

This has been the basic idea behind further developments in the industry, namely that of promoting said elasticity, as for example in the patent FR2719347, where additional punched forms or "reliefs" are provided in the metal sheet so as to eliminate any possible interference between the movable part and the fixed part of the nut. This is in general an overall goal of the industry, for this type of nut, which the present invention also aims to achieve.

It must be said that, despite the results achieved by the prior art, it still suffers from a number of drawbacks. For example, generally speaking, there exists the aforementioned problem of excessive rigidity of said known nuts. This consists in the great difficulty of arranging them in position and the practical impossibility of removing them from the panel once they have performed their function or have deteriorated or become obsolete.

Another existing drawback at present is the specialized nature of said type of nuts resulting from the limited range of their elastic action. Thus, some nuts are suitable for panels with a large thickness, while other nuts are suitable for smaller thicknesses, such that they are not interchangeable in terms of use and, generally speaking, for each specific nut there is a reduction in the range of thicknesses of the panels for which they may be satisfactorily used.

Another drawback which the present invention aims to solve is that associated with the high torsional forces which may arise when tightening the screw. Owing to the intrinsic constructional nature of the nuts according to the art, they are relatively weak in response to torsional forces which may deform the upper strip and damage the nut.

The present invention aims to overcome said drawbacks. These and other advantages of the invention will become clearer during the course of the description thereof provided below.

BRIEF DESCRIPTION OF THE INVENTION

Nut with a C-shaped profile, of the type formed by means of punching of a flat strip which, folded in the form of a clip, is mounted on a panel and which has a passage for a screw and at least a single thread for the screwed member, there being provided a retaining claw, a bottom rear flange, side stops, open zones or reliefs situated at the front or rear of the hole in the lower base, together with horizontal and longitudinal connecting portions.

The upper strip is provided with a fixing element for a screw, of the type consisting of an approximately conical or spherical tube having a multiple threading with or without a self-locking property, or, in another embodiment, said threaded cylinder is replaced by a single-thread helical mechanism.

The arrangement of the elements described, as shown in the accompanying drawings and illustrated in the corresponding description of the practical embodiments, achieves all the predefined objects of the invention.

In particular, the retaining claw allows easy insertion of a tool, such as the tip of a screwdriver, which is able to slacken the retaining pressure of the clip nut on the panel, thereby allowing easy removal thereof.

A nut according to the present invention, owing to its constructional configuration, also has an improved elastic behavior which has the effect of making it easier to perform mounting thereof on the panel and improving the rigidity of the nuts according to the prior art.

Finally, the provision of its anti-torsion mechanism ensures an improved performance compared to the prior art upon tightening of the screw.

BRIEF DESCRIPTION OF THE DRAWINGS

In order to facilitate understanding of the invention three sheets of drawings are provided solely by way of a non-limiting example thereof.

FIG. 7 is an elevation view of the nut according to the embodiment of the preceding figures, mounted on the panel, showing the heightwise overdimensioning of its longitudinal connecting portions.

FIG. 8 is a perspective view of another possible embodiment of the present invention, more specifically with a self-locking multiple threading.

FIG. 9 is another perspective view of another possible embodiment of the invention, this time with a tightening cross-section formed by a helical line of a single thread acting against the screw.

DETAILED DESCRIPTION OF THE INVENTION

The present invention consists of a nut with a C-shaped profile, of the type formed by a punched metal sheet folded onto itself for fixing onto a panel, wherein one of the arms, i.e. the upper base (10) has, formed therein, a hole for the arrangement of a screwed device with at least one thread and wherein the other arm, i.e. the lower base (11) has, aligned with the axis of the preceding hole, another hole for receiving the screw for tightening the nut.

The nut according to the invention is preferably made of heat-treated tempered carbon steel. This feature means that it has the mechanical hardness and elasticity properties which are necessary and convenient for this type of product. In the same way it may be made of any type of material with hardness and elasticity properties which are suitable for the desired application.

Figure 1:
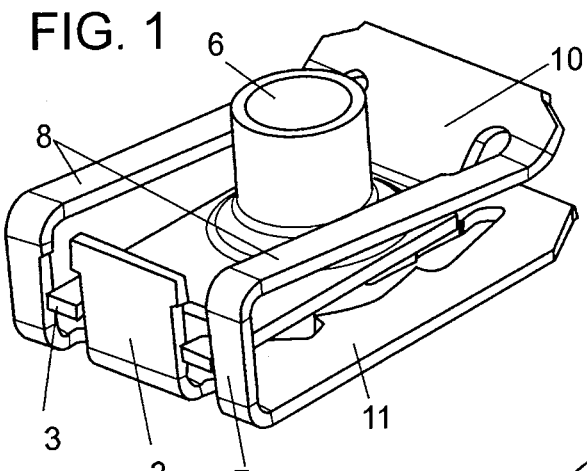
FIG. 1 shows a perspective view of one of the embodiments of the present invention.
Figure 2:
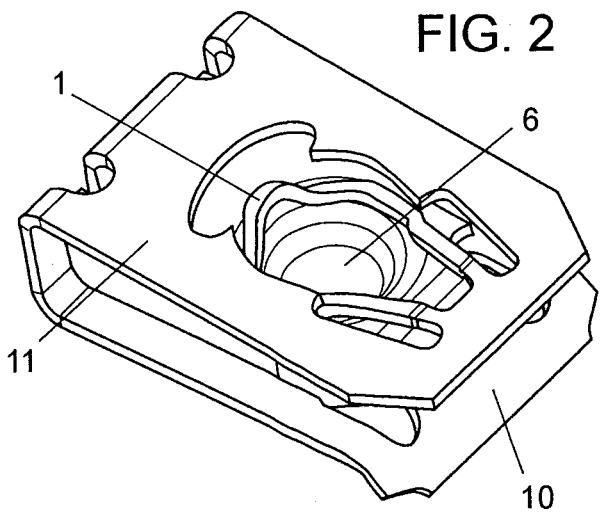
FIG. 2 is a perspective view, from below, of the embodiment shown in the preceding figure.
Figure 3:
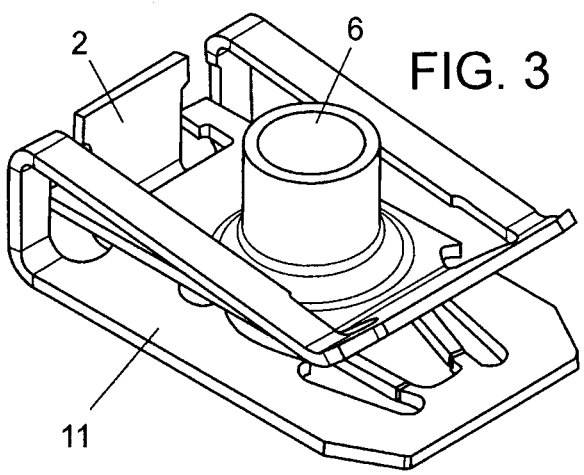
FIG. 3 is another perspective view of the nut shown in the preceding figures.
Figure 4:
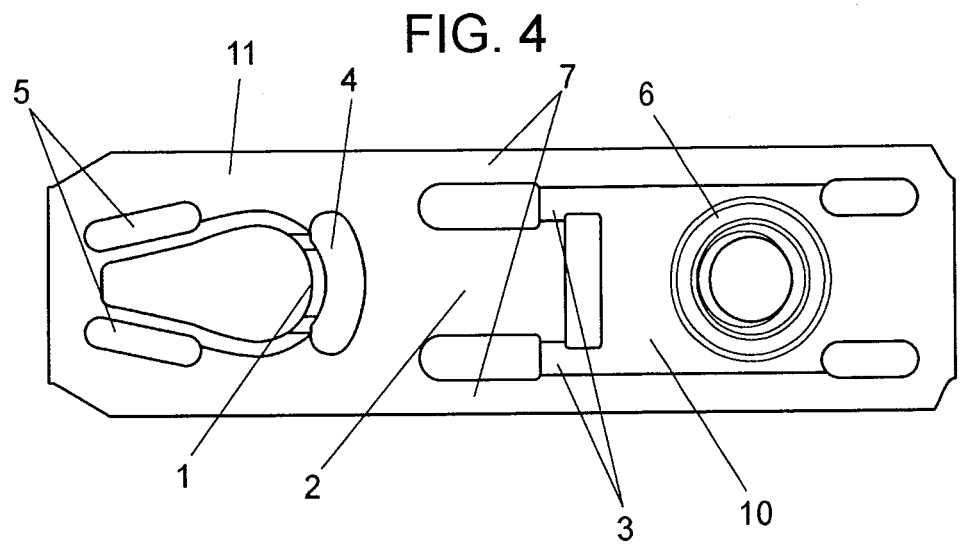
FIG. 4 is a plan view of a metal sheet showing the positions of the incisions and deformed zones forming the parts of the nut as shown in the preceding figures.

As shown in FIG. 4, the nut according to the invention may be obtained from a flat strip by means of deformation and punching so as to form all the parts thereof.

Folding is performed so as to form an upper strip (10) and a lower strip (11) which are provided with a hole for receiving the screw or tightening member which is applied against the nut, it being possible to vary the shape of the retaining element depending on the intended use of the nut or the tightening member used. As shown in FIGS. 1 to 7, in said embodiment the means for retaining the screw is a threaded cylinder with a multiple thread, while in the embodiment shown in FIG. 8, said screw retaining element is designed with a self-locking feature.

A zone with an approximately conical or spherical geometrical form may exist at the joining point between said threaded cylinder (6) and said upper base (10), facilitating on the one hand the positioning of the screw and increasing the rigidity of the said screwed section.

In FIG. 9 the retaining element consists of a slit or track forming a helical line of a single retaining thread, whereby, in accordance with the prior art, it may have radial slits.

In general, as already stated, any retaining element inside said type of nut is considered as being included within the basic idea of the invention.

During use of the nut described, the latter is fitted around the panel by means of elastic deformation of its strips (10 and 11) in the form of a clip. The upper strip (10) is constructed, as a result of its shaped incisions and in accordance with the prior art, so as to be detached from the remainder of the nut, forming horizontal connecting portions (8), as shown in the figures. This allows suitable movement of said strip (10) avoiding any interference or collision with the fixed parts of the clip nut.

In the invention, as shown in FIG. 7, the longitudinal connecting portions (7) which join together the upper strip (10) and the lower strip (11) have an overdimensioned height compared to the prior art. If "P" is the maximum thickness of the panel envisaged for use with the nut described, the height of said longitudinal connecting portion (7) now exceeds not only said height "P", but also the sum of said distance and the height "h" between the lower base and the highest point of a retaining claw (1), this being a characteristic feature of the present invention.

Figure 5:
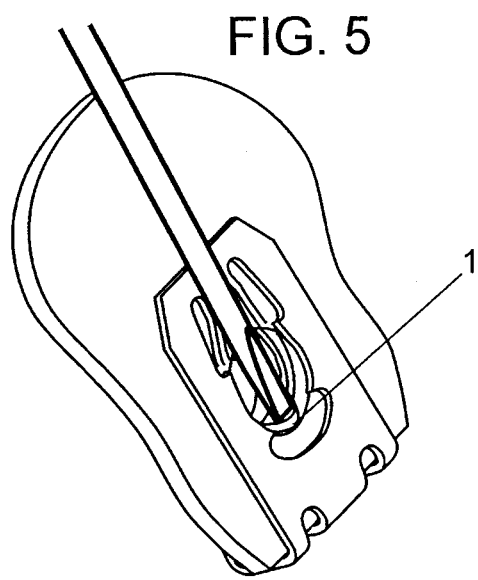
FIGS. 5 and 6 show respective perspective views of a nut according to the present invention, mounted on a panel, and the tip of a screwdriver acting on a retaining claw for releasing said nut from the panel.
Figure 6:
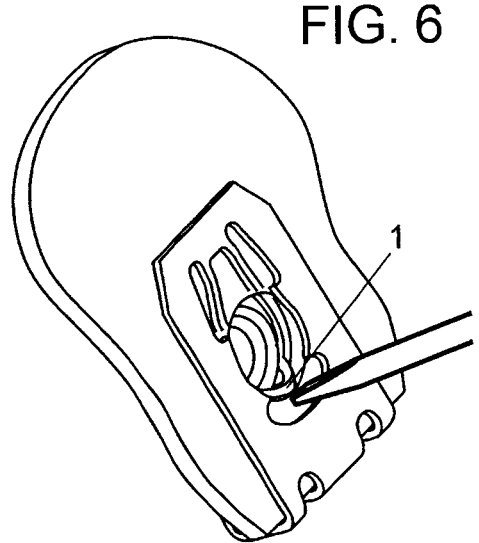

It is this retaining claw which allows, as shown in FIGS. 5 and 6, easy disassembly of the nut by means, for example, of the tip of a screwdriver, improving considerably the performance characteristics of said types of nut which is always very difficult to remove.

Said retaining claw (1) in the preferred embodiment has a form which is approximately that of an inverted "U", viewed in a transverse plane close to the plane of said lower base (11). The object of said arrangement is to facilitate the action of the nut extraction tool which acts on said retaining claw (1). The function of said retaining claw (1) is also assisted by clearance spaces or reliefs which are formed around it, i.e. rear reliefs (4) and front reliefs (5) (see Figures) which are intended to facilitate the action of a tool for freeing said nut from the panel.

The nut according to the invention also has an anti-rotation mechanism acting against the torsional forces present during screwing together of the part. In fact, there is a bottom rear flange (2) and side stops (3) on said upper base (10) which form said anti-rotation mechanism.

Said rear flange (2) extends from the lower base (11) according to one of the characteristic features of the present invention. This bottom rear flange (2) allows, when the nut is pushed during assembly thereof, the upper base (10) to move freely depending on the thickness of the panel, reducing the force needed to perform said assembly.

The figures also show the presence of lateral projections on said surfaces, acting as stops, these limiting the possible travel during interaction of said movable parts with each other.

As a whole, the nut according to the present invention, within the categories of clip nuts or clamping nuts which are C-shaped, or U-shaped to describe them in another way, achieves all the predefined objects, providing a highly versatile fast-action nut which can be advantageously adapted to a wide range of panel thicknesses and which, being provided with a mechanism for removing the nut, separating it from the panel on which it was mounted, includes improved anti-rotation functions, being able to adapt to different means for retaining the tightening member.

It is understood that the final details and form described here may be varied provided that they do not modify the basic idea of the invention.

The invention claimed is:

1. A NUT WITH A C-SHAPED PROFILE, of the type formed by a punched metal sheet folded onto itself for fixing onto a panel, including at least one arm corresponding to an upper base having a hole for the arrangement of a screwed device, the screwed device having at least one thread, and the nut including at least one other arm corresponding to a lower base which is aligned with an axis of the preceding hole, has another hole for receiving a nut tightening screw, said upper base being provided with incisions which define horizontal connecting portions separated from a body of said upper base and longitudinal connecting portions which form an extension of the horizontal connecting portions and which join together said upper base and said lower base, which has a retaining claw which is designed to facilitate application of a tool for slackening the pressure which the nut applies to the panel to which it is fixed; which has a bottom rear flange, and side stops on said upper base which form an anti-rotation mechanism when the nut tightening screw is tightened on the nut; said bottom rear flange freeing from pressure said upper base during assembly on the panel; and said longitudinal connecting portions are over dimensioned.

2. THE NUT WITH A C-SHAPED PROFILE as claimed in claim 1, wherein said retaining claw has a form which is approximately that of an inverted "U" in a transverse plane close to a plane of said lower base.

3. THE NUT WITH A C-SHAPED PROFILE as claimed in claim 1, which has rear reliefs and front reliefs designed to facilitate the action of a tool for freeing said nut from the panel.

4. THE NUT WITH A C-SHAPED PROFILE as claimed in claim 1, which has lateral projections on said bottom rear flange and said side stops, acting as stops, these limiting the possible travel during interaction of movable parts with each other.

5. THE NUT WITH A C-SHAPED PROFILE as claimed in claim 1, wherein said screwed device is a threaded cylinder with a multiple thread.

6. THE NUT WITH A C-SHAPED PROFILE as claimed in claim 1, wherein an approximately conical or spherical geometrical form is present at a joining zone between a threaded cylinder and said upper base.

7. THE NUT WITH A C-SHAPED PROFILE as claimed in claim 1, further comprising a modified threaded cylinder that is provided with a self-locking multiple threading.

8. THE NUT WITH A C-SHAPED PROFILE as claimed in claim 1, wherein said screwed device is formed by a helical line.

9. THE NUT WITH A C-SHAPED PROFILE as claimed in claim 8, wherein said helical line has radial incisions.

10. The nut of claim 1, wherein:
the bottom rear flange and the side stops are part of an integral body including the lower base and the upper base.

11. A device, comprising:
a nut with a C-shaped profile, comprising a punched metal sheet folded onto itself and configured to be fixed onto a panel, including at least one arm corresponding to an upper base having a hole for the arrangement of a screwed device with at least one thread and including at least one other arm corresponding to a lower base which is aligned with an axis of the preceding hole, has another hole for receiving a nut tightening screw, said upper base being provided with incisions which define horizontal connecting portions separated from a body of said upper base and longitudinal connecting portions which form an extension of the horizontal connecting portions and which join together said upper base and said lower base, which has a retaining claw which is configured to facilitate application of a tool for slackening the pressure which the nut applies to the panel to which it is fixed; which has a bottom rear flange, and side stops on said upper base which form an anti-rotation mechanism when the nut tightening screw is tightened on the nut; said bottom rear flange freeing from pressure said upper base during assembly on the panel.

12. The nut of claim 1, wherein:
said longitudinal connecting portions have a height which is greater than the sum of the greatest thickness (P) of the panel foreseen for use with said nut and the height (h) of said retaining claw in relation to said lower base.

13. The nut of claim 1, wherein:
the at least one arm corresponding to the upper base and the at least one other arm corresponding to the lower base, the horizontal connecting portions, the body of said upper base and longitudinal connecting portions which form the extension of the horizontal connecting portions, the bottom rear flange and side stops are part of a monolithic component.

14. The nut of claim 1, wherein:
the side stops form an open recess in the upper base.

15. The nut of claim 1, wherein:
the bottom rear flange extends from the lower base along an axis of extension, wherein components of the nut extend only partially about the bottom rear flange relative to the axis of extension.

16. The nut of claim 1, wherein:
the bottom rear flange has respective sides that face the respective longitudinal connecting portions, and where there is only respectively one side stop between the respective sides of the bottom rear flange that face the longitudinal connecting portions.

17. The nut of claim 1, wherein:
the side stops are part of the upper base and wherein the rear flange is directly connected to the lower base.

18. The nut of claim 1, wherein:
the side stops are fingers that extend from the upper base.

19. The nut of claim 1, wherein:
the side stops are located such that the bottom rear flange and a respective longitudinal connecting portion are located on opposite sides of respective side stops.

20. The device of claim 11, wherein:
the bottom rear flange and the side stops are part of an integral body including the lower base and the upper base.

21. The device of claim 11, further comprising a panel interposed between the upper base and the lower base, wherein the panel has a thickness (P), and wherein the longitudinal connecting portions have a height that is greater than a sum of the greatest thickness (P) of the panel between the bases and a height (h) of said retaining claw in relation to said lower base.

22. The device of claim 11, wherein the longitudinal connecting portions have a height that is greater than about eight times the thickness of the lower base.

23. The device of claim 11, wherein the longitudinal connecting portions have a height that is greater than about ten times the thickness of the lower base.

24. The device of claim 11, wherein said retaining claw has a form which is approximately that of an inverted "U" in a transverse plane close to a plane of said lower base.

25. The device of claim 11, further comprising rear reliefs and front reliefs configured to facilitate the action of a tool for freeing said nut from the panel.

26. The device of claim 11, further comprising lateral projections on said bottom rear flange and said side stops, acting as stops, these limiting the possible travel during interaction of movable parts with each other.

27. The device of claim 11, wherein said screwed device is formed by a helical line.

28. The device of claim 27, wherein the helical line has radial incisions.

29. The device of claim 11, wherein:
the bottom rear flange and the side stops are part of an integral body including the lower base and the upper base.

30. The nut of claim 1, wherein:
the bottom rear flange and the side stops are part of an integral body including the lower base and the upper base, and wherein no part of the integral body completely surrounds a longitudinal axis of the bottom rear flange.

31. The device of claim 11, wherein:
the bottom rear flange and the side stops are part of an integral body including the lower base and the upper base, and wherein no part of the integral body completely surrounds a longitudinal axis of the bottom rear flange.

32. The device of claim 11, wherein:
the punched metal sheet, the at least one arm corresponding to the upper base, the at least one other arm corresponding to the lower base, the horizontal connecting portions, the body of the upper base, and the longitudinal connecting portions which form the extension are part of a monolithic component.

33. The device of claim 11, wherein:
the side stops form an open recess in the upper base.

34. The device of claim 11, wherein:

the bottom rear flange extends from the lower base along an axis of extension, wherein components of the nut extend only partially about the bottom rear flange relative to the axis of extension.

35. The device of claim 11, wherein:

the bottom rear flange has respective sides that face the respective longitudinal connecting portions, and where there is only respectively one side stop between the respective sides of the bottom rear flange that face the longitudinal connecting portions.

36. The device of claim 11, wherein:

the side stops are part of the upper base and wherein the rear flange is directly connected to the lower base.

37. The device of claim 11, wherein:

the side stops are fingers that extend from the upper base.

38. The device of claim 11, wherein:

the side stops are located such that the bottom rear flange and a respective longitudinal connecting portion are located on opposite sides of respective side stops.

\* \* \* \* \*